United States Patent [19]

Schagen

[11] Patent Number: 4,598,233
[45] Date of Patent: Jul. 1, 1986

[54] COLOR DISPLAY TUBE AND DEVICE HAVING SUCH A TUBE

[75] Inventor: Pieter Schagen, Redhill, England

[73] Assignee: U.S. Philips Corporation, New York, N.Y.

[21] Appl. No.: 188,406

[22] Filed: Sep. 18, 1980

[30] Foreign Application Priority Data

Sep. 21, 1979 [GB] United Kingdom ............... 7932745

[51] Int. Cl.[4] ..................... H01J 29/70; H01J 29/72
[52] U.S. Cl. .................................. 315/366; 313/422
[58] Field of Search ......................... 315/366; 313/422

[56] References Cited

U.S. PATENT DOCUMENTS

| | | | |
|---|---|---|---|
| 2,999,957 | 9/1961 | Schagen et al. | 313/422 |
| 3,377,500 | 4/1968 | Burns | 313/422 |
| 3,484,647 | 12/1969 | McGuinness | |
| 3,621,319 | 11/1971 | Heynisch | 313/422 |
| 3,683,224 | 8/1972 | Lea | 313/422 |
| 4,137,486 | 1/1979 | Schwartz | 315/366 |
| 4,153,856 | 5/1979 | Siekanowicz et al. | 313/422 |

Primary Examiner—Theodore M. Blum
Attorney, Agent, or Firm—Robert J. Kraus

[57] ABSTRACT

A compact color display tube is provided in which a modulated electron beam enters a repelling trajectory control field, formed between a mesh electrode and a planar electrode, at an acute angle $\alpha$. The beam follows a parabolic trajectory and approaches a target electrode bearing bands of phosphor stripes at substantially the same angle. The mesh electrode, comprising a plurality of parallel conductors, is disposed adjacent to the target electrode. The conductors of the mesh electrode extend parallel to the stripes and are spaced at a pitch corresponding to the pitch of the repeating bands of phosphor stripes. The target electrode is held at a potential such that the electron beam passing through the space between a pair of the conductors is focused and deflected onto a phosphor line of the target. A colored picture can be produced using a single electron beam by a spot wobbling technique or by scanning each phosphor line sequentially. In the case of a triple beam in-line electron gun, each beam has its own, slightly different trajectory and these trajectories coincide in the apertures of the mesh before impinging on their respective phosphors.

4 Claims, 8 Drawing Figures

COLOR DISPLAY TUBE AND DEVICE HAVING SUCH A TUBE

BACKGROUND OF THE INVENTION

The present invention relates to a colour display tube having, in an envelope, means for producing at least one electron beam, a target including a target electrode and bands of parallel phosphor lines. The phosphor lines of each band luminesce in different colours. A mesh electrode mounted adjacent to the target and a planar electrode extending substantially parallel to the mesh electrode define a trajectory control space. Means is provided for introducing each electron beam along an inclined path into the trajectory control space where the beam follows a parabolic trajectory and approaches the target at a substantially constant angle. In a particular application, the present invention relates to a compact colour display tube of small dimensions, such as one having a screen of approximately 12.5 cm (5 inches) diagonal.

A compact monochrome display tube is disclosed in British Patent Specification No. 865,667.

In this patent specification embodiments are disclosed in which an electron beam is produced by an electron gun whose axis is inclined or is parallel to the plane containing a fluorescent screen. At a predetermined point in the trajectory of the electron beam it enters a field produced by two electrodes at different potentials. One of the electrodes is connected to the fluorescent screen. The beam which enters the field at a constant angle $\beta$ follows a parabolic path to impinge upon the fluorescent screen at a certain angle $\alpha$ independently of the distance traversed. The trajectory is determined by applying a signal at the field time base frequency to the field producing electrode opposite the screen. By means of deflection electrodes the electron beam can be scanned at line frequencies and a raster scan can be achieved. Since the electron beam lands on the fluorescent screen at the same angle for all parabolic trajectories, the spot of the electron beam on the screen will always have substantially the same shape.

A colour display tube of the kind mentioned in the opening paragraph is disclosed in British Patent Specification No. 1,223,723. In that patent specification an orthogonally focused, single electron beam passes through a frame scanning means and is deflected through 225° in order that it can enter a trajectory control space at an angle of 45°. The trajectory control space is defined by a planar reflecting or repelling electrode and a woven mesh screen grid between which electrode and grid a sawtooth voltage having a line scanning frequency is applied. The beam is then decelerated by a colour selection electrode of the Venetian blind type, the potential of which colour selection electrode is modulated at a high frequency, produced for example by mixing the colour subcarrier and its first harmonic. This is done in such manner that the electron beam, as it line scans across a screen on the side of the Venetian blind electrode remote from the screen grid, is deflected onto a particular phosphor line of a band of at least two parallel phosphor lines. The provision of a screen grid and a Venetian blind type electrode having a large number of louvres makes the construction of the tube complicated, costly and unsuitable for use with compact display tubes having screens of the order of 12.5 cm. diagonal. A Venetian blind type of electrode for such a small size of display tube would be fragile and difficult to make because not only would the spacing between adjacent louvres have to be substantially less than 1 mm. to avoid losing resolution but also each louvre has to be set at exactly the same angle.

SUMMARY OF THE INVENTION

Accordingly it is an object of the present invention to provide a compact colour display apparatus which uses at least one electron beam and does not require a decelerating electrode.

According to the present invention, a colour display tube is characterized in that the mesh electrode comprises a plurality of substantially parallel conductors which are spaced apart by a distance corresponding to the width of a band of phosphor lines. The electron beam is deflected and focused on to one phosphor line by the mesh electrode.

In an embodiment of the display tube in accordance with the present invention means are provided for deflecting the electron beam in a direction parallel to the phosphor lines. Thus a raster scan can be established with frame scanning taking place along the phosphor lines and line scanning taking place in a direction transverse to the phosphor lines. In order to produce a colour display when an electron gun is used for producing a single electron beam, either a source of spot-wobbling frequency, e.g. the colour sub carrier frequency, may be connected to the target electrode so that decoding of the signal actually takes place on the screen, or the phosphor lines are scanned line sequentially in which case the electron beam scans at three times the line frequency. In the case of using a triple beam in-line electron gun, the trajectories of each beam remain substantially constant relative to each other during each line scan. As a result of this each beam can be focused onto its associated phosphor line by the potential difference between the mesh electrode and the target electrode.

The target may comprise a substantially flat glass plate on which the target electrode and the bands of phosphor lines are provided. The phosphor lines may be applied by screen printing. Thus compared with the manufacture of a conventional colour cathode ray tube, the application of the phosphors can be done without the mesh electrode having to be present. Any misalignment between the conductors of the mesh electrode and the phosphor lines can be corrected by adjusting the potential difference between the mesh and target electrodes.

The present invention also relates to an apparatus including the colour display tube in accordance with the present invention, first means for producing a first potential difference between the mesh and planar electrodes to define the trajectory control field, and second means for producing a second potential difference between the target and mesh electrodes to deflect and focus each electron beam on to one phosphor line.

BRIEF DESCRIPTION OF THE DRAWING

The present invention will now be described, by way of example, with reference to the accompanying drawings, wherein.

DESCRIPTION OF THE PREFERRED EMBODIMENTS

Figure 1:
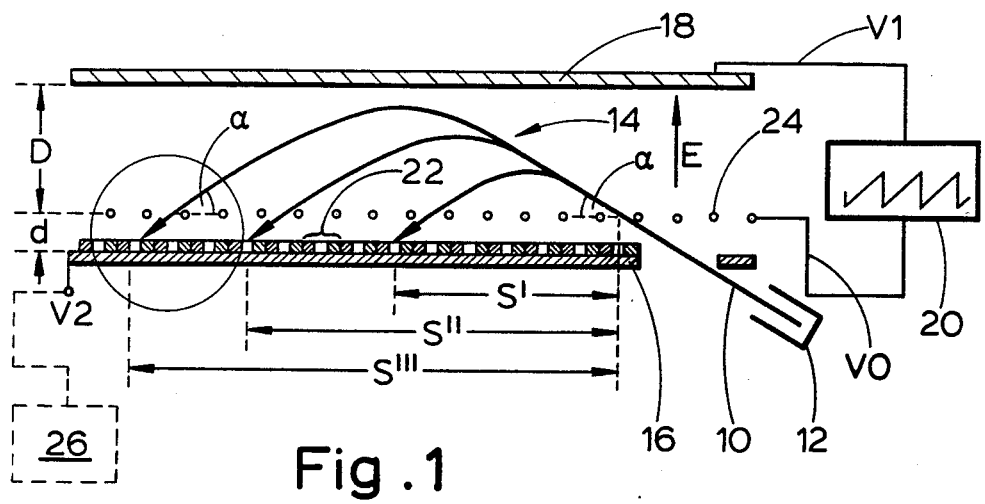
FIGS. 1, 1A and 2 are diagrammatic drawings which serve to illustrate the principle of the invention and two possible manners in which a colour display can be produced using a single electron beam, FIG. 1A being an enlarged view of the encircled portion of FIG. 1.

In order to facilitate the understanding of the present invention corresponding reference numerals and letters will be used to indicate corresponding parts. Further as the theory relating to obtaining parabolic trajectories of an electron beam is discussed in detail in British Patent Specification No. 865,667, it will not be repeated in the present specification.

Accordingly it is sufficient to say that if an electron beam 10 from an electron gun 12 enters at an angle $\alpha$ into a trajectory control space 14 comprising a mesh electrode 24 and a planar electrode 18 held at voltages V0 and V1 which produce a repelling field E (V1 being more negative than V0) then the beam 10 will follow a parabolic trajectory through the control space and pass through the interstices of the mesh electrode 24 at a constant, acute angle $\alpha$. The range S of the beam 10 is determined by the field intensity which may be varied by varying the voltage V1 of the planar electrode 18. Thus, in the case of a low intensity field, the range will be relatively great as indicated by S''', conversely a high intensity field will cause the range to be relatively small as indicated by S'. Intermediate ranges indicated by S'' will be obtained for values of field intensity between the high and low values. Conveniently the electron beam 10 can be made to scan linearly across the electrode 24 by applying an appropriately changing voltage V1 to the planar electrode 18 by for example a time base circuit 20 which in a television receiver could be the line time base circuit. Because the electron beam 10 passes at a constant angle $\alpha$ through the mesh electrode 24 then the electron beam 10 produced will be of a substantially constant size and shape anywhere on the mesh electrode 24.

In the diagram of FIG. 1 triplets 22 of phosphor lines are provided on a (transparent) target electrode 16 carried by a transparent faceplate (not shown). The triplets 22 extend normal to the plane of the drawing. The conductive mesh electrode 24, which may be a wire mesh or an etched sheet, comprises a plurality of spaced parallel conductors which are aligned with the triplets 22 of phosphor lines. Conveniently the mesh electrode 24 is arranged so that the electron beam 10 passing through the interstices in the mesh 24 can be made to land on a designated triplet 22 of phosphor lines. However in the event of a misalignment then the voltage V2 applied to the target electrode can be adjusted to correct for any mislanding of the electron beam 10. A voltage V2 exceeding V0 is applied to the target electrode 16, and the potential difference is adjusted so that the electron beam 10 is focused and deflected onto one selected phosphor line of a triplet 22 at any one instant.

In the case of a single beam electron gun 12 it can be made to scan in the frame direction by a technique such as will be described with reference to FIG. 2 or by applying orthodox angular deflection prior to entry into the trajectory control space 14. Reverting to FIG. 1 assuming that the electron beam 10, which has been suitably modulated, is line scanning in a direction transverse to the phosphor lines, then a colour picture can be produced in a number of ways.

One way is a dot-sequential or spot-wobbling technique in which a signal at the chrominance sub-carrier frequency is applied to the target electrode 16 by a high frequency source 26 shown in broken lines producing a suitable signal at 4.43 MHz. Another way is by line sequential scanning in which the corresponding first phosphor line, then the second phosphor line and finally the third phosphor line of each of the triplets 22 is scanned, the complete scanning of a triplet being completed in the period of one single line scan, for example 64 $\mu$s.

Figure 2:
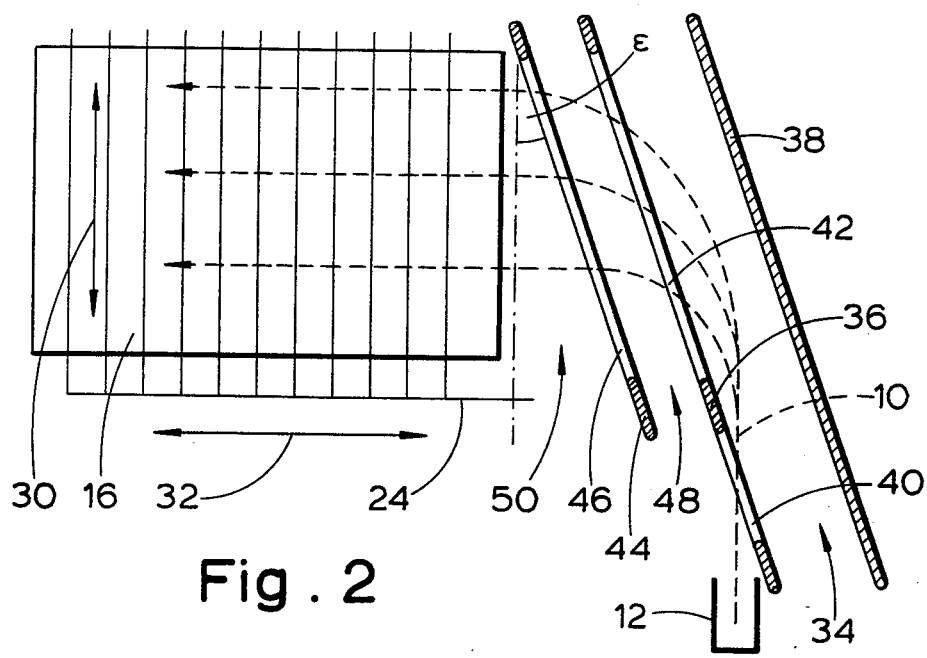

Turning now to FIG. 2, a means of producing frame scan of the electron beam 10 will be described. For ease of identification the frame scanning direction is indicated by the double headed arrow 30 and the line scanning direction is indicated by the double headed arrow 32. The phosphor lines (not shown) and conductors of the mesh 24 extend in the direction of the arrow 30.

In order to produce a frame scan, a duplicate of the line scan means is provided. An auxiliary trajectory control space 34 is formed by two parallel, auxiliary control electrodes 36, 38. The control electrode 36 has an aperture 40 through which the electron beam 10 from the electron gun 12 enters at an acute angle into the repelling field between the energized electrodes 36, 38. The range of the parabolic trajectory of the electron beam is determined by the voltage applied to the electrode 38. This voltage may be controlled by another time base circuit (not shown) operating at field scanning frequency. The deflected electron beam passes through an elongate slot 42 provided in the electrode 36.

Another electrode 44 having an elongate slot 46 is arranged parallel to the electrodes 36, 38. The electrode 44 is held at a higher D.C. potential than that of the electrode 36 and forms a constant acceleration space 48. After passing through the slot 46 the electron beam enters a field free triangular shaped space 50 before entering the trajectory control space 14 (FIG. 1). The selection of the apex angle $\epsilon$ of the space 50 is chosen so that the successive trajectory planes are parallel to the side edges of the screen.

Figure 3:
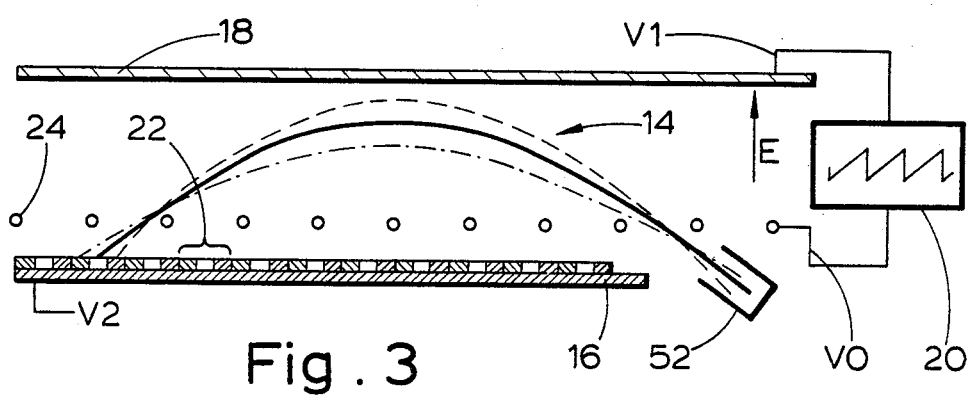
FIG. 3 is another diagrammatic drawing illustrating a manner in which a colour display can be produced using three in-line electron beams.

FIG. 3 shows diagrammatically a colour display tube comprising a triple beam in-line electron gun 52.

Three electron beams, one for each primary colour, enter the trajectory control space 14 between a planar electrode 18 and a mesh electrode 24 at slightly different acute angles. The mesh electrode 24 comprises parallel conductors disposed adjacent to the target electrode 26. The electrodes 24 and 18 are at voltages V0 and V1, respectively, V1 being less than V0 to provide a repelling field E. As in FIG. 1, triplets 22 phosphor lines extending normal to the plane of the drawing are disposed on a target electrode 26 which is held at a voltage V2 which is greater than V0. The electron beams follow respective parabolic trajectories, the ranges of which are determined by the intensity of the field E and the entry angles of the beams. The three electron beams coincide as they pass through the mesh electrode 24 and the beams form a so-called cross over at that area. The beams are focused and bent slightly towards the phosphor lines in a direction perpendicular to the conductors of the mesh 24 by the effect of the fact that V2 is greater than V0.

The frame scanning of the electron beams is done by deflecting the beams prior to their entering the trajectory control space, for example as is done in FIG. 2. Line scanning is done by varying V1 relative to V0, for example by using a timebase circuit 20.

In the illustrated embodiments the line and frame scanning may be carried out the opposite way round to that described but it is generally preferred to carry out the frame scanning before the electron beams enter the trajectory control space.

A number of different tube constructions which may be operated in the ways described in FIGS. 1 through 3 will be discussed with reference to FIGS. 4 to 7. For convenience the discussion will be of a single beam electron gun tube but it is to be understood that such tubes could comprise a triple beam electron gun.

Figure 4:
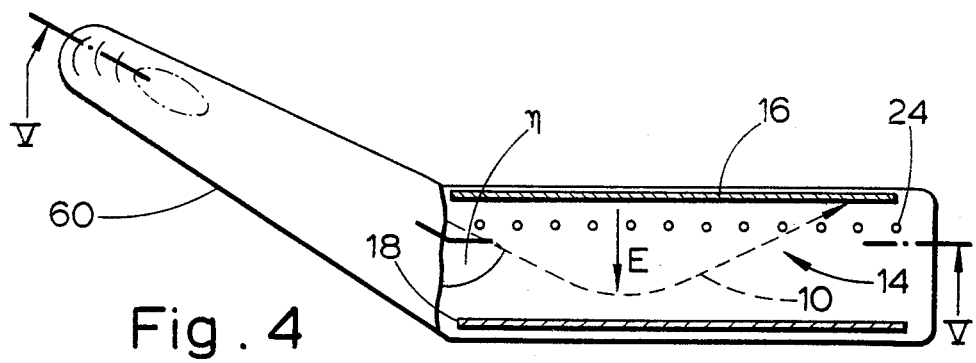
FIG. 4 is an end elevational view partly in section of a colour display tube.
Figure 5:
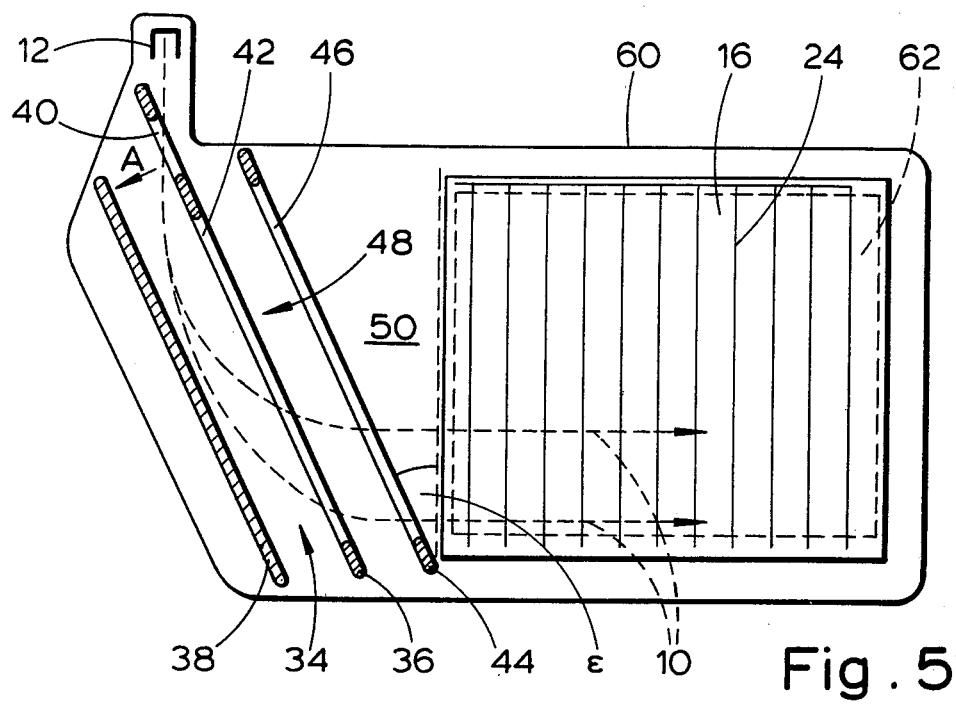
FIG. 5 is a view taken on the line V—V of FIG. 4, and FIGS. 6 and 7 represent views of another embodiment of a display tube which has an electron mirror, FIG. 6 being a view on the VI—VI of FIG. 7 which itself is a view on the line VII—VII of FIG. 6.

FIGS. 4 and 5 show diagrammatically two views of a display system suitable for a television receiver or the like, FIG. 5 being a section taken along the line V—V of FIG. 4. Specific voltages and angles are given by way of illustration to assist understanding of the description.

In an envelope 60, the electron beam 10 from the electron gun 12 enters, through an aperture 40, into the auxiliary trajectory control space 34 extending between the control electrodes 36 and 38 of the auxiliary system. The beam enters at an angle of, say, 65° to the lines of force of the control field A set up by auxiliary electrodes 36 and 38.

The cathode of gun 12 may be grounded, and the electrode 36 and the final anode of the gun may both be at a constant D.C. potential of, say, 1.1 KV with respect to said cathode so that the energy of the electrons on entry at aperture 40 is 1.1 KeV. The field A is determined by the potential of the control electrode 38 and the latter may be varied with a sawtooth wave-form between say 500 V and 810 V to effect a frame scan along the operative length of the exit slot 42 provided in the second control electrode 36. Thus by varying the voltage on the electrode 38 the beam is constrained to emerge through this slot at a constant orientation.

The beam then enters a uniform accelerating field 48 of substantially uniform and constant intensity set up by an elongate planar electrode 44 held at a D.C. potential of, say, 5 Kv (with respect to the cathode) and arranged parallel to electrodes 36 and 38. The beam is deflected by field 48 through a constant angle of, say, 40° and, since its angle of entry into the space of field 48 is constant, its angle of exit is also constant.

The beam emerges through a further slot 46 in the electrode 44 into the triangular field-free space 50. This space has an apex angle $\epsilon$; if the above values are adopted, angle $\epsilon$ is given a value of 25° to ensure that the successive trajectory planes are parallel to the side edges of the target or picture screen 62 (the latter are vertical when the gun axis is positioned horizontally), comprising triplets of phosphor lines (not shown).

The beam then enters a substantially uniform field in the main trajectory control space 14 at an angle $\eta$ (FIG. 4) of e.g. 65° to the lines of force. The plane of the beam in the chambers containing fields A, 48 and 50 is therefore tilted by 25° with respect to the parallel electrodes 18 and 24 which set up the control field E, as will be seen from FIG. 4. The mesh electrode 24 is disposed adjacent to the target electrode 16. The line scan is generated by varying the potential V1 of the planar electrode 18 between say 2.0 and 3.75 KV, the mesh electrode 24 remaining at a potential V0 which is equal to the potential of 5 KV applied to the electrode 44. The target electrode 16 is held at a voltage V2 which is greater than the voltage V0 applied to the mesh electrode 24. The colour image to be displayed may be produced by line sequential scanning or spot wobbling as discussed with respect to FIG. 1.

Figure 6:
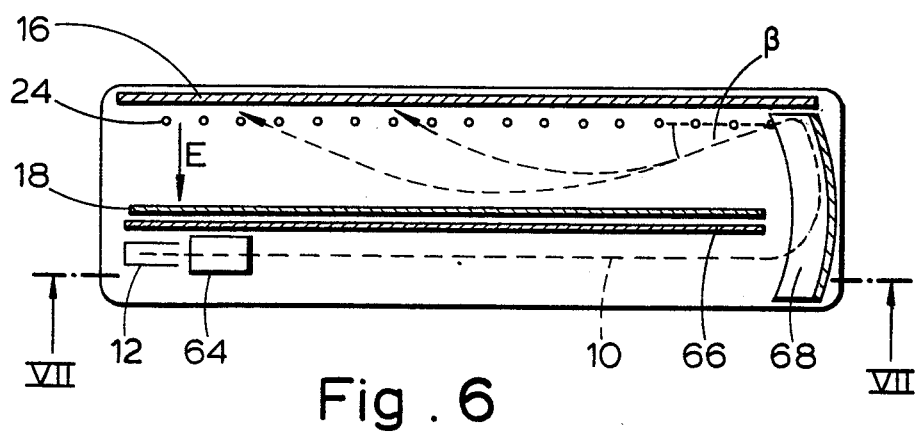
Figure 7:
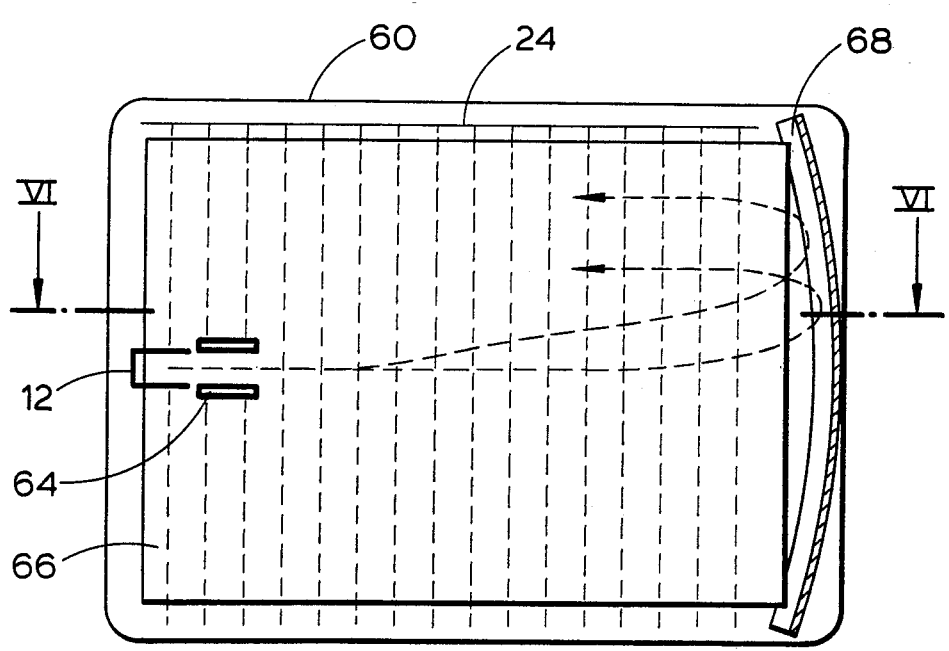

A further two-dimensional scanning and display arrangement suitable for television and like purposes will now be described with reference to FIGS. 6 and 7.

From an electron gun 12, a beam 10 of, say 5 KeV electrons in a field-free space passes between frame deflection means (which may be magnetic although shown as electrostatic deflection plates 64) which sweep the beam 10 across a part-toroidal or substantially part-toroidal conductive electron mirror 68. This mirror 68 serves three purposes:

(1) It bends the beam through about 200°.

(2) It displaces the beam from the rearward field-free space towards the luminescent target (not shown) on electrode 16.

(3) It renders all the trajectory planes of the reflected beam paths parallel.

The beam then enters the opposing control field E between the mesh electrode 24 and the repelling planar electrode 18 e.g. at an angle of 70° to the lines of force (i.e. an angle $\beta$ of 20° to electrode 16). The mesh electrode 24 is maintained at 5 KV, and by varying the voltage on the electrode 18 the line scan is generated. The target electrode 16 is at a voltage greater than that at the electrode 18. Screening between the rear space and the front trajectory control space is effected with the aid of a plate electrode 66.

The envelope 60 of the two tube constructions described may comprise at least two parts joined together using a suitable frit seal (not shown). One of the parts may comprise a generally flat faceplate and the other of the parts may be generally dished shaped and contain the gun and the majority of the electrodes. Because the final part of the trajectory of the or each electron beam is controlled by the voltages applied to the target electrode 16 and the mesh electrode 24, any misalignment between the triplets of phosphor stripes and the conductors of the mesh electrode can be corrected electrically. Accordingly the phosphors can be applied to the faceplate by a thin film screen printing process or settling process. Accordingly there is no need for the precise alignment of phosphor lines with the apertures in the colour selection electrode as is necessary with conventional colour display tubes.

In a practical embodiment a colour display tube in accordance with the invention comprises a screen having a diagonal of 12.5 cm, i.e. 100×76 mm and 330 phosphor triplets, each of pitch 0.3 mm and comprising phosphor lines of 80 μm width separated by black light absorbing stripes of 20 μm. The mesh electrode 24 may comprise parallel wires of 0.05 mm. diameter with spacing of 0.3 mm. or an etched metal sheet having columns of vertically elongate apertures of 1 mm. by 0.3 mm, the elongate apertures in each column being offset vertically relative to the elongate apertures in each adjoining column by 0.5 mm, the width of the metal between adjacent columns and adjacent apertures in a column being 0.05 mm.

In the case of a display tube having such a screen size, a distance D=25 mm. (FIG. 1) between the mesh electrode 24 and the planar repeller electrode 18 and an entry angle $\alpha$=30°, a full 100 mm. line scan of the screen will be achieved using V0=5 KV, and V1 varying from 1.5 KV to 3.7 KV.

Figure 1A:
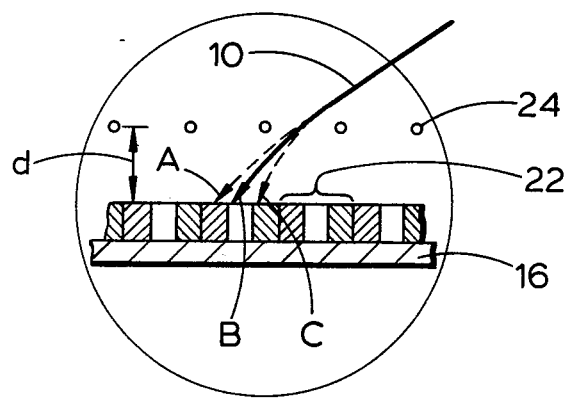

In order to focus and deflect the electron beam onto one phosphor line of a triplet of phosphor lines in a display tube operated under the above conditions it has been found that a voltage V2A=10.0 KV deflects the electron beam 10 to the phosphor A (FIG. 1A), V2B=10.35 KV deflects the beam to phosphor B and V2C=10.72 KV deflects the beam to phosphor C; the spot size of the electron beam being of the order of 0.06 mm.

What is claimed is:

1. A color display tube comprising:
   (a) a target electrode having parallel bands of phosphor lines, the respective lines in each band luminescing in different colors;
   (b) spaced-apart electrodes defining a trajectory control space, including:
      (1) a planar electrode; and
      (2) a mesh electrode positioned adjacent to the target electrode, said mesh electrode comprising parallel conductors having spaces therebetween which correspond with respective bands of the phosphor lines;
   (c) means for producing a modulated electron beam and directing it into the trajectory control space;
   (d) means for producing a first potential difference, between the mesh electrode and the planar electrode, for directing the electron beam to a designated band of phosphor lines; and
   (e) means for producing a second potential difference, between the mesh electrode and the target electrode, for deflecting the electron beam onto a selected phosphor line in the designated band.

2. A color display tube as in claim 1, wherein:
   (a) the means for producing the first potential difference comprises a source of a time-varying voltage which effects scanning of the electron beam across the bands of phosphor lines; and
   (b) the means for producing the second potential difference comprises a source of time-varying voltage which effects spot wobbling of the electron beam onto selected phosphor lines during scanning by the beam.

3. A color display tube as in claim 1, wherein:
   (a) the means for producing the first potential difference comprises a source of a time-varying voltage which effects scanning of the electron beam across the bands of phosphor lines; and
   (b) the means for producing the second potential difference comprises a source of time-varying voltage which effects line sequential scanning by the electron beam, whereby the different color phosphor lines are sequentially selected during successive scans by the beam.

4. A color display tube comprising:
   (a) a target electrode having parallel bands of phosphor lines, the respective lines in each band luminescing in different colors;
   (b) spaced-apart electrodes defining a trajectory control space, including:
      (1) a planar electrode; and
      (2) a mesh electrode positioned adjacent to the target electrode, said mesh electrode comprising parallel conductors having spaces therebetween which correspond with respective bands of the phosphor lines;
   (c) means for producing a plurality of modulated electron beams, each identified with a respective one of the different phosphor colors;
   (d) means for producing a first potential difference, between the mesh electrode and the planar electrode, for directing the electron beams to a designated band of phosphor lines; and
   (e) means for producing a second potential difference, between the mesh electrode and the target electrode, for deflecting the electron beams onto the respective color phosphor lines with which they are identified.

* * * * *